United States Patent [19]

Cantarella et al.

[11] 4,167,818

[45] Sep. 18, 1979

[54] ELECTRONIC INCLINATION GAUGE

[75] Inventors: Robert Cantarella, South Burlington, Vt.; Paul Tasetano, North Ferrisburg; George E. Strickholm, South Lincoln, both of Vt.

[73] Assignee: Robert Cantarella, Burlington, Vt.

[21] Appl. No.: 875,094

[22] Filed: Feb. 3, 1978

[51] Int. Cl.² .............................................. G01C 9/06
[52] U.S. Cl. ........................................................ 33/366
[58] Field of Search ......................................... 33/366

[56] References Cited

U.S. PATENT DOCUMENTS

| 2,511,525 | 6/1950 | Bradwell et al. | 33/366 |
| 3,171,213 | 3/1965 | Swarts et al. | 33/366 |
| 3,172,212 | 3/1965 | Pappas | 33/366 |
| 3,786,472 | 1/1974 | Scopacasa | 33/366 |
| 3,869,805 | 3/1975 | Dieringer | 33/366 X |
| 3,911,592 | 10/1975 | Crask | 33/366 X |
| 4,028,815 | 6/1977 | Buckley et al. | 33/366 |
| 4,121,347 | 10/1978 | Thele | 33/366 |

FOREIGN PATENT DOCUMENTS 354444  8/1931  United Kingdom ..................... 33/366
558152  6/1977  U.S.S.R. .................................. 33/366

*Primary Examiner*—Charles E. Phillips
*Attorney, Agent, or Firm*—Michael Ebert

[57] ABSTRACT

An inclination gauge that includes a bar placeable against a surface to be gauged to determine the degree to which the surface is inclined with respect to the horizontal or vertical axis and to provide a readout in digital as well as in analog terms. Mounted on the bar is a gravity-sensing potentiometer coupled to a balancing circuit to produce an analog output voltage which has a null value when the bar is placed against a horizontal or vertical surface and which has a magnitude and polarity or phase that depends on the extent and direction of the deviation from the norm when the surface being gauged is inclined. The analog voltage is converted into a corresponding digital value that is applied to a digital display. Also mounted on the bar are conventional spirit level tubes, one being arranged for horizontal and the other for vertical gauging. Thus the user of the gauge can observe the displacement of the air bubble in each tube from a null position and thereby obtain an analog reading of inclination, whereby analog and digital readings are concurrently presented on the same bar.

9 Claims, 7 Drawing Figures

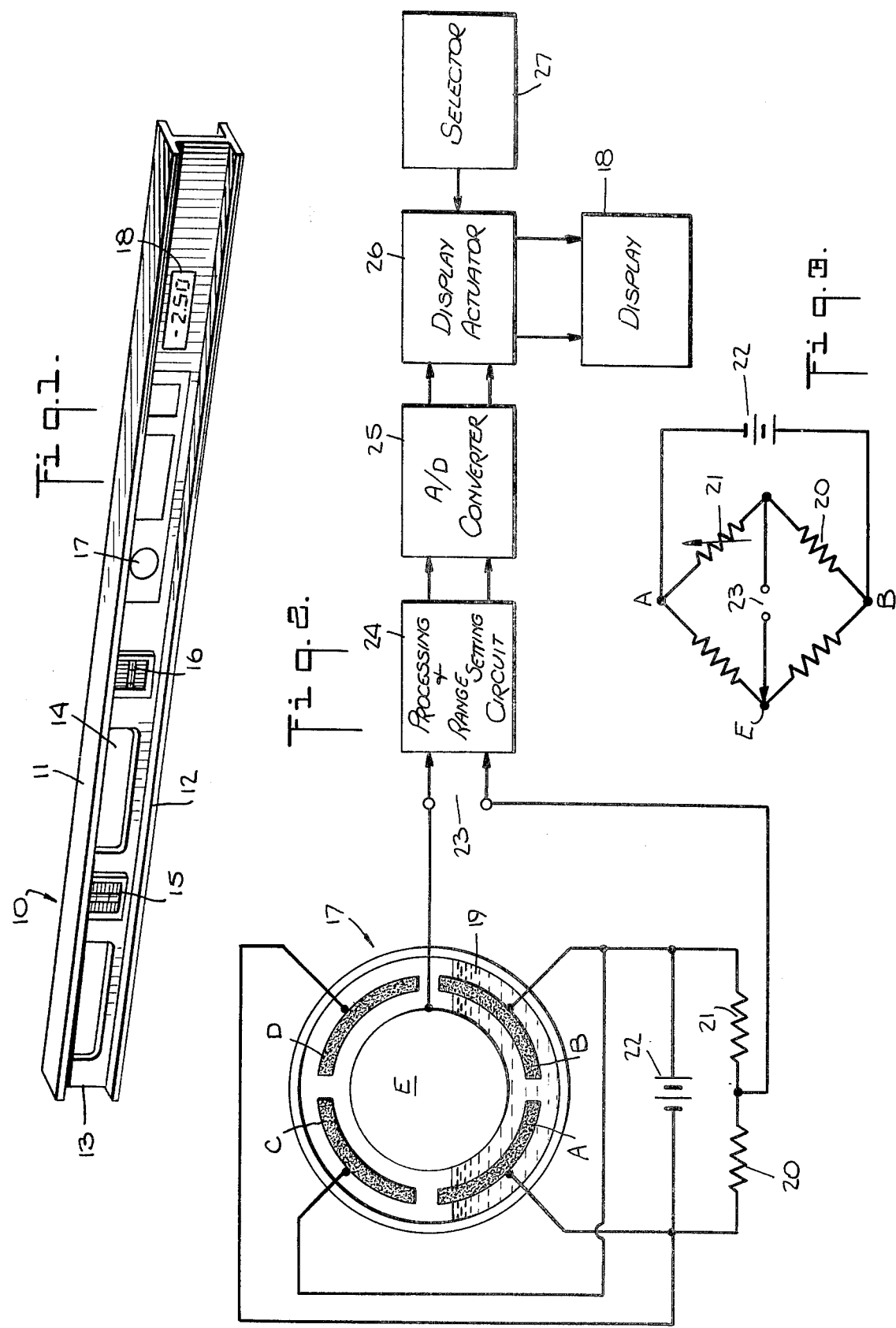

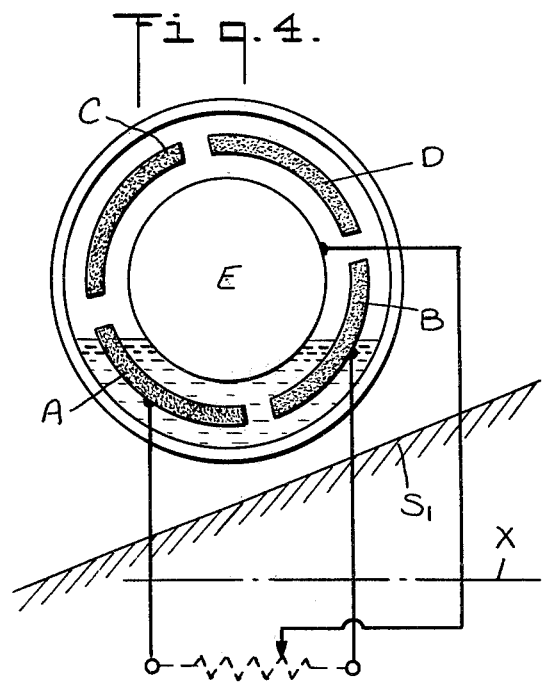
Fig. 4.
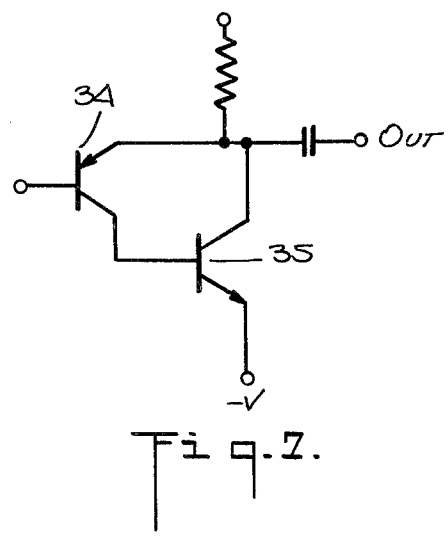
Fig. 7.
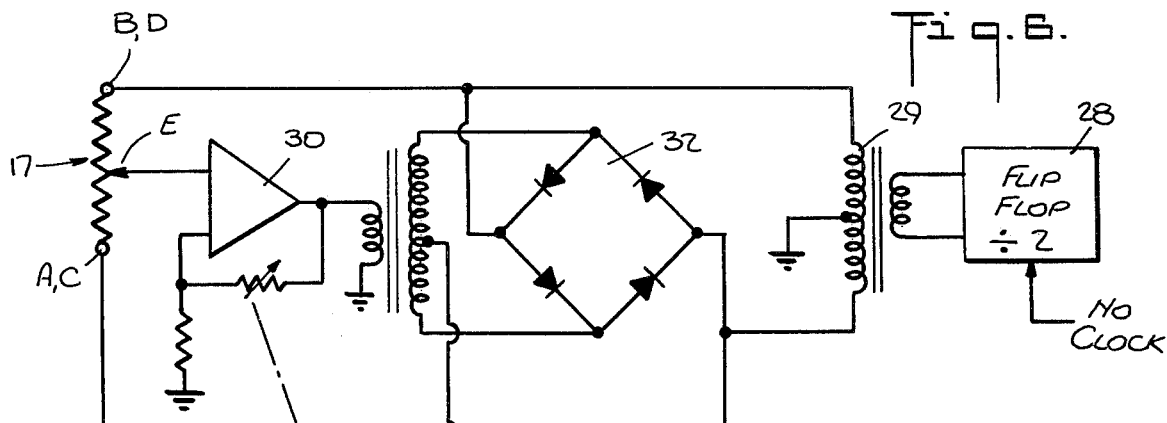
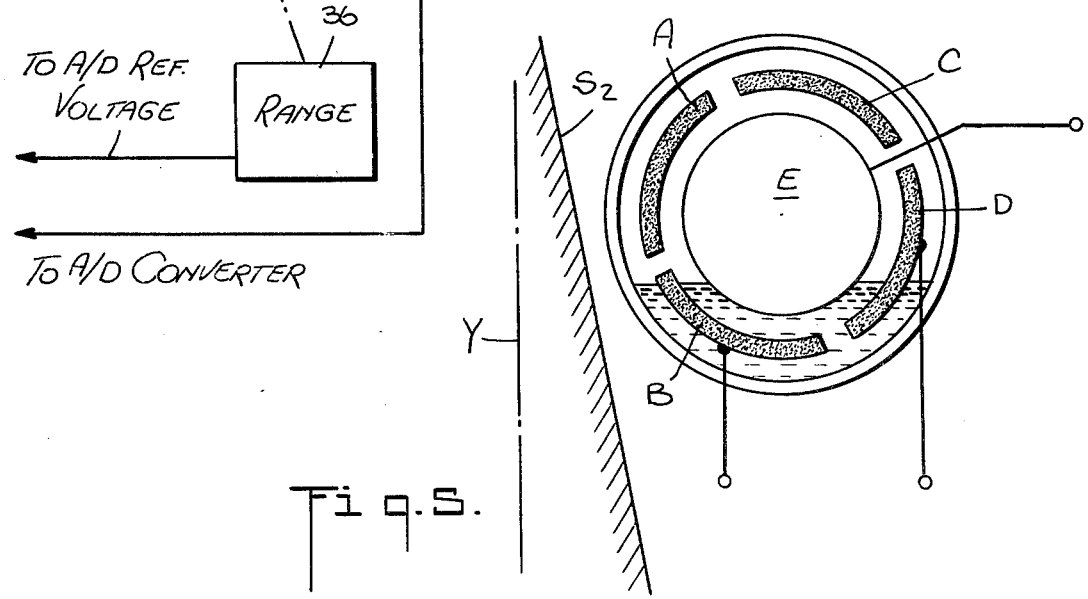
Fig. 8.
Fig. 5.

ELECTRONIC INCLINATION GAUGE

BACKGROUND OF INVENTION

This invention relates generally to level measurement, and more particularly to an inclination gauge providing both a digital and an analog read-out.

As used in mechanics, level is a term referring to any direction that is at right angles to the force of gravity. Because of the earth's curvature, this direction is not precisely horizontal, but the deviation from the horizontal is negligible for short distances. The tool kit of any competent bricklayer or carpenter invariably includes a spirit level. However, the use of such levels is by no means limited to the field of construction, for this level is an essential component of many delicate physical, astronomical and engineering instruments.

Operation of the spirit level depends on the simple principle that an air bubble seeks the highest point in a container enclosing the liquid in which the bubble is formed. In a standard spirit level, the glass tube housing the liquid is either slightly curved with its convex side upward, or the tube is ground with a curved inner bore.

The glass tube is supported on a rigid base or bar, and the bubble therein always comes to equilibrium at the same point whenever the bar has the same slope with respect to the horizontal plane. By providing the spirit level tube with a graduated scale, the level may be made a sensitive gauge for measuring changes in the angle of inclination.

From the practical standpoint, the value of a spirit level in providing an accurate indication of inclination depends on the ability of the user to discern the precise position of the air bubble with respect to the scale indicia on the tube. While the condition of the user's eyesight is a factor in this regard, as well as the angle at which he views the bubble, for many ordinary level applications, the fact that the readings taken by the user are somewhat inexact may not be a serious drawback; but in other situations, even a slight error cannot be tolerated.

But whether or not the user of the spirit level is capable of reading the level without difficulty, the fact is that the user, in order to obtain a correct reading, must exercise care, and this consumes time—which, in a procedure requiring frequent level readings, adds materially to the cost of the operation.

While the invention will be described in connection with an inclination gauge which supplants or supplements conventional spirit levels of the type used in the construction industry, it is to be understood that the gauge in accordance with the invention is also useful as a surveyor's level attachable to a telescope to determine differences in elevation, and in other instruments which entail the measurement of inclination.

There are many prior patents which deal with so-called "inclinometers" to measure the magnitude and direction of inclination with respect to the force of gravity and to produce an electrical value in accordance therewith. Among these patents are the following:

Rickert U.S. Pat. No. 2,759,272;
Stimler U.S. Pat. No. 2,722,056;
Shea U.S. Pat. No. 2,893,134;
Harris U.S. Pat. No. 3,490,153;
Cothran U.S. Pat. No. 3,478,437;
Foody U.S. Pat. No. 3,114,209;
Remington U.S. Pat. No. 3,487,303;
Holderer U.S. Pat. 3,164,023
Bauer U.S. Pat. No. 3,559,294;
Shawhan U.S. Pat. No. 3,906,471;
Shawhan U.S. Pat. No. 3,766,658;
Remington U.S. Pat. No. 3,442,023.

SUMMARY OF INVENTION

In view of the foregoing, the main object of this invention is to provide an inclination gauge having a digital readout whereby the observer, regardless of the condition of his eyesight, as long as he is able to read numbers, is given an accurate indication of inclination.

More particularly, it is an object of this invention to provide an inclination gauge of the above type which also includes spirit level components whereby the observer is given both a "coarse" spirit level analog reading and a concurrent "fine" electronic level digital reading.

The practical advantage of an inclination gauge which affords both an analog and a digital readout is that the user in many situations need not check the "fine" digital reading, where it becomes immediately apparent from the "coarse" analog reading that the surface being gauged is grossly out of line. On the other hand, the fact that the analog and digital readings are concurrently available on the gauge for comparison gives the user an immediate check of any defect in the operation of the gauge.

A "fine" reading is vital, say, in construction, when one seeks to attain a perfectly horizontal or vertial alignment and where it is therefore necessary to determine the slightest deviation from the desired condition. But when the inclination is far out of line, one is not then concerned with the degree of deviation; for it is only when one approaches the horizontal or vertical condition that the exact degree of deviation need be taken into account. With a dual-reading inclination gauge in accordance with the invention, construction procedures can be expedited, for the gauge can be used to obtain quick analog impressions as well as precise digital reading.

Also an object of the invention is to provide an accurate and reliable inclination gauge whose digital display is selectively capable of indicating inclination relative to the horizontal or vertical either in terms of angular degrees or in inches-per-foot. Radians or mills of angle could also be employed by appropriately setting the conversion factor on the digital conversion Briefly stated, these objects are attained in an inclination gauge in accordance with the invention that includes a bar that is placeable against a surface to determine the extent to which this surface is inclined with respect to the horizontal or vertical axis and to provide a readout of the deviation from the norm in both analog and in digital terms.

Mounted on the bar is a gravity-sensing potentiometer which is connected in a balancing circuit to produce an analog output voltage which attains a null value only when the bar is placed against a vertical or horizontal surface, and which has an amplitude and polarity or phase that depends on the extent and direction of deviation when the surface is sloped.

The analog voltage derived from the balancing circuit is applied to an analog-to-digital converter which output is fed through a display actuator to a digital display to present a reading indicating inclination in terms of angular degree or inches-per-foot. By appropriately setting the conversion factor of the digital converter, a reading may be obtained in mills or radians.

Also mounted on the bar are conventional spirit level tubes, one arranged for horizontal and the other for vertical gauging, so that the user of the gauge can observe the displacement of the air bubble in each tube from a null position and thereby obtain an analog reading of the inclination, the analog and digital readings being currently presented on the same bar.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a dual-reading inclination gauge in accordance with the invention;

FIG. 2 is a block diagram of the electronic section of the gauge which includes a gravity-sensing potentiometer;

FIG. 3 is the equivalent circuit diagram of the potentiometer;

FIG. 4 schematically illustrates the position of the gravity-sensing potentiometer on a surface sloped with respect to the horizontal axis;

FIG. 5 schematically illustrates the position of the gravity-sensing potentiometer on a surface sloped with respect to the vertical axis;

FIG. 6 is a schematic diagram of another embodiment of the electronic section using a-c excitation; and FIG. 7 is a schematic diagram of one stage of the electronic section.

DESCRIPTION OF INVENTION

The Basic Structure:

Referring now to FIG. 1, there is shown an inclination gauge in accordance with the invention which provides concurrent readings in digital and analog terms with respect to the inclination of a bar 10 relative to a horizontal or a vertical axis.

Bar 10 has an I-beam formation constituted by parallel upper and lower planar flanges 11 and 12 and an interconnecting web 13. Mounted within web 13 on opposite sides of an elongated opening 14 are standard spirit level tubes 15 and 16. Tube 15 is arranged transversely relative to the longitudinal axis of the bar, whereby when the bar is placed against a vertical surface, the tube then extends horizontally and the bubble therein is at its midpoint or null position; but when the surface is inclined relative to the vertical axis, the bubble is displaced from the null to an extent and direction which represents an analog of the degree of displacement. In practice, beam 10 may be a wooden bar, a channel or a rectangular bar beam.

Spirit level tube 16 is arranged along the longitudinal axis of bar 10 so that when the bar is placed on a horizontal surface, its bubble is at null; and when the surface is inclined, the bubble is displaced accordingly. Thus spirit level tubes 15 and 16 operate in the conventional manner.

Also mounted on web 13 of the bar is a gravity-sensing potentiometer cell 17 which operates in conjunction with a balancing circuit to provide an analog voltage whose magnitude and sense reflect the deviation of the bar from either the horizontal or vertical norm. By "sense" is meant the polarity of the analog voltage in the case of d-c excitation of the potentiometer balancing circuit, and the phase of the voltage in the case of a-c excitation thereof.

Thus an inclination toward the right produces an analog voltage in one polarity or phase whose magnitude depends on the extent of deviation from the vertical or horizontal axis, and an inclination toward the left to the same extent produces a voltage of the same magnitude but of opposite polarity or phase.

The analog voltage from the potentiometer balancing circuit is processed to change its amplitude for range calibration. The analog voltage is then converted into a corresponding digital value which is applied to the actuator of a digital display 18 to provide a readout in digital terms. The number is preceded by a − or + symbol indicating the direction of inclination. The display may be of the LED or LCD type used in pocket calculators, wherein each station of the display is formed by multiple segments which, when selectively actuated, define the digits 0 to 9.

Thus the inclination gauge has an electronic and a spirit level section that concurrently present analog and digital readings of inclination with respect to the horizontal or vertical axis. The user of the gauge is given a "coarse" analog reading from which he can quickly determine the degree of deviation from the norm, and a "fine" digital reading from which he can determine the precise deviation.

First Embodiment of Electronic Section:

Referring now to FIG. 2, there is shown an electronic inclination gauge section which includes gravity-sensing potentiometer 17. This potentiometer is in the form of a sealed circular cell partially filled with a semi-conductive liquid 19 such as alcohol. Housed within the cell is a disc-shaped center electrode E, and concentrically-disposed about center electrode E are four arcuate electrode segments, A, B, C and D. Electrode segments A to D are symmetrically arranged in quadrature so that, as shown in FIG. 2, when the bar of the gauge lies in a horizontal plane, electrodes A and B are almost fully immersed and liquid 19 is equally distributed with respect to these electrodes.

The surface of liquid 19 is always parallel to the horizontal axis regardless of how the bar is oriented. Hence when the bar is placed on a surface $S_1$ which is inclined with respect to the horizontal axis X, as shown in FIG. 4, the surface of the liquid remains parallel to this axis; but the orientation of segments A and B reflects the inclination. The distribution of liquid 19 is now unequal, such that more of electrode segment A is immersed than segment B.

Thus, as shown in the equivalent circuit in FIG. 3, because electrodes A and B are bridged by semi-conductive liquid 19, and center electrode E is interposed in the resistance path formed between electrodes A and B, a potentiometer is defined thereby, in which electrode E functions as a slider whose effective position in the resistance path depends on the inclination.

In FIG. 2, because the bar is placed on a horizontal surface and the liquid is equally distributed with respect to electrode segments A and B, the slider electrode E is effectively at the midpoint of the potentiometer. This slider position shifts in a direction and to an extent depending on inclination.

In FIG. 5, there is shown the relationship of the cell electrodes to liquid 19 when the gauge is placed against a surface $S_2$ inclined with respect to the vertical axis Y. In this situation, liquid 19 partially immerses electrodes B and D, the liquid distribution therebetween reflecting the deviation to define a potentiometer in which center electrode E is again the slider.

Because of the quadrature relationship of the segment electrodes, regardless of where the bar is placed, two of the electrodes will always be immersed. In order, therefore, to provide a gravity-sensing potentiometer which is operative for both horizontal and vertical inclinations, electrode C, as shown in FIG. 2, is connected to electrode A, and electrode D to electrode B.

Associated with the potentiometer is a balancing circuit which, in the case of FIG. 2, is formed by a pair of resistors 20 and 21 serially-connected between electrodes A, C and electrodes B, D to form a bridge across whose input diagonals is connected a d-c source 22, the output being yielded at terminals 23 connected to the output diagonals. The equivalent circuit is shown in FIG. 3.

When the inclination gauge is placed against a perfectly horizontal or vertical surface, then slider electrode E is effectively at the midpoint of the potentiometer formed by the resistance path between electrode paid A and B or whichever pair is then operative with respect to the liquid pool, the resistances on either side of the slider being equal. By providing matching resistors 20 and 21, the bridge is then in balance and a null output is obtained. In practice, however, because of slight geometric asymmetries in the electrodes, small disparities in the electrode resistances may be encountered. Resistor 21 is therefore made adjustable to exactly null the bridge for a gauge placement in line with the horizontal or vertical axis.

The analog voltage at output diagonals 23 of the bridge for any given inclination has a magnitude and polarity in accordance therewith. That is to say, the amplitude of the voltage is proportional to the angle of slope and the polarity thereof is indicative of the direction of the slope.

This amplitude is adjusted by a range-setting circuit 24 which may take the form of an operational amplifier so that a given increment in amplitude represents a change of one angular degree, or whatever other span is desired. The voltage from range-setting circuit 24 is applied to an analog-to-digital converter 25 of any suitable design to produce a corresponding digital value which is applied to a display actuator 26 for controlling display 18.

Display actuator 26 is provied with a switch-operated selector 27 so that the display gives a numerical reading in angular degrees or in inches per foot, whichever is preferred by the user. Or the display may be in radians or mills.

All of the circuits associated with the gravity-sensing potentiometer can be produced in integrated circuit form; hence, in practice, an integrated circuit chip of small size may be used to minimize the space requirements of this electronic gauge section on the bar.

Second Embodiment of Electronic Gauge Section:

In the first embodiment, d-c excitation is used in conjunction with the bridge circuit. When using a semiconductive liquid, polarization of the electrodes may be encountered, the polarization somewhat disturbing the accuracy of the output signal. This drawback is overcome by using a-c excitation in the manner shown in FIG. 6.

In this arrangement, a-c excitation is provided by a flip-flop 28 which is periodically triggered by clock pulses derived from an analog-to-digital converter which is powered by a d-c source, the square wave output of the flip-flop being applied to the primary of a transformer 29 whose center-tapped secondary is connected across electrodes A, C and B, D of the gravity-sensing potentiometer 17.

Slider E of the potentiometer is connected to the input of an operational amplifier 30 which is controlled by a range-adjustment circuit 36. The output of the amplifier is applied to the primary of a transformer 31 whose center-tapped secondary is connected to a rectifier ring 32 which, in conjunction with transformers 29 and 31, forms a double-balanced mixer or synchronous detector whose output, which is taken from the center-tap of transformer 31, is an analog voltage. This voltage is fed to the A/D converter to provide digital values for operting the display in the manner previously described.

To attain good balance, transformers 29 and 31 are wound on a toroidal core, with the two halves of the secondary winding and the primary winding being formed by a trifilar cable wound about the core.

Flip-flop 28 divides the A/D converter clock frequency by 2 to provide a symmetrical drive for the potentiometer and mixer circuits. By "symmetry" in this situation is meant that the negative and positive portions of the square excitation wave are of equal duration and amplitude. In practice, the A/D converter clock may be a Motorola MC 1443 unit.

In practice, the excitation voltage applied to the gravity-sensing potentiometer is sufficient to obviate the need for gain in driving the double-balanced mixer. Hence amplifier 30 may be a simple augmented emitter-follower, as shown in FIG. 7, including transistors 34 and 35 to provide an impedance transformation which drives the mixer without loading the potentiometer.

While there have been shown and described preferred embodiments of an electronic inclination gauge in accordance with the invention, it will be appreciated that many changes and modifications may be made therein without, however, departing from the essential spirit thereof.

I claim:

1. An inclination gauge comprising:
   A a bar placeable against a surface inclined from a vertical or horizontal reference axis;
   B circuit means including a gravity-sensing potentiometer mounted on said bar and a balancing circuit associated with said potentiometer and having an excitation voltage applied thereto to produce an analog voltage whose magnitude and sense depends on the inclination of the surface from either reference axis, said analog voltage having a null value when said surface is aligned with either the vertical or horizontal reference axis;
   C means to convert said analog voltage to a corresponding digital value; and
   D means on said bar to display said value to provide a readout of said inclination.

2. A gauge as set forth in claim 1, further including a pair of spirit levels mounted on said bar, one being arranged to provide a bubble indication which is an analog of the inclination from the horizontal axis, and the other bubble indication which is an analog of the inclination from the vertical axis, whereby said gauge affords concurrent analog and digital readings for horizontal and vertical slopes.

3. An inclination gauge as set forth in claim 1, wherein said bar is an I-beam having parallel flanges which are joined by a web on which said potentiometer is mounted.

4. A gauge as set forth in claim 1, wherein said balancing circuit is a bridge circuit and said excitation is a direct voltage.

5. A gauge as set forth in claim 1, wherein said excitation is an alternating voltage, further including means to rectify the output of said circuit means to produce a direct analog voltage.

6. A gauge as set forth in claim 1, further including selector means associated with said display to present a readout of inclination in terms selected from any one in the following class of reading scales, namely: angular degrees, in inches-per-foot, radians or mils.

7. An inclination gauge as set forth in claim 1, wherein said potentiometer is formed by a circular cell partially filled with a pool of semi-conductive lioquid, and an electrode assembly disposed within said cell and constituted by a disc-shaped center electrode and four electrode segments concentrically-arranged in quadrature relation about the center electrode, said pool partially immersing the center electrode and the lowermost two of said electrode segments when the bar is placed against a surface to be gauged, the distribution of liquid between the immersed electrode segments depending on inclination, the other two electrode segments being connected respectively to the immersed electrode segments.

8. A gauge as set forth in claim 7, wherein said liquid is alcohol.

9. A gauge as set forth in claim 1, further including means coupled to said circuit means to adjust the range of the gauge.

* * * * *

UNITED STATES PATENT OFFICE
CERTIFICATE OF CORRECTION

Patent No. 4,167,818                    Dated September 18, 1979

Inventor(s) Robert Cantarella, Paul Tasetano and George E. ~~Strickholm~~

It is certified that error appears in the above-identified patent and that said Letters Patent are hereby corrected as shown below:

Column 2, line 31 "vertial" should have read -- vertical --

Column 5, line 22 "paid" should have read -- pair --

Column 6, line 15 "operting" should have read -- operating --

Column 5, line 47 "provied" should have read -- provided --

Claim 7, line 3 "lioquid" should have read -- liquid --

Signed and Sealed this

Fourth Day of December 1979

[SEAL]

Attest:

Attesting Officer

SIDNEY A. DIAMOND

Commissioner of Patents and Trademarks